US009912619B1

(12) United States Patent
Kohli

(10) Patent No.: US 9,912,619 B1
(45) Date of Patent: Mar. 6, 2018

(54) PUBLISH-SUBSCRIBE BASED EXCHANGE FOR NETWORK SERVICES

(71) Applicant: Juniper Networks, Inc., Sunnyvale, CA (US)

(72) Inventor: Jaspal Kohli, Sunnyvale, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 947 days.

(21) Appl. No.: 14/294,620

(22) Filed: Jun. 3, 2014

(51) Int. Cl.
- *G06F 15/16* (2006.01)
- *H04L 12/58* (2006.01)
- *G06F 9/54* (2006.01)

(52) U.S. Cl.
CPC ............ *H04L 51/046* (2013.01); *G06F 9/542* (2013.01); *G06F 2209/547* (2013.01)

(58) Field of Classification Search
CPC ... H04L 51/046; G06F 2209/547; G06F 9/542
See application file for complete search history.

(56) References Cited

U.S. PATENT DOCUMENTS

| | | | | |
|---|---|---|---|---|
| 6,298,455 B1 * | 10/2001 | Knapman | ......... | G06F 17/30011 707/999.01 |
| 7,089,211 B1 * | 8/2006 | Trostle | ................. | H04L 9/0833 705/51 |
| 7,694,344 B1 * | 4/2010 | Fletcher | ................. | H04L 63/20 726/22 |
| 8,793,322 B2 * | 7/2014 | Beardsmore | ............ | H04L 12/66 709/203 |
| 8,843,580 B2 * | 9/2014 | Beardsmore | ............ | H04L 51/14 709/203 |
| 2005/0021843 A1 * | 1/2005 | Duigenan | ............. | H04L 12/185 709/238 |
| 2005/0235058 A1 * | 10/2005 | Rackus | ................. | H04L 41/046 709/224 |
| 2007/0067389 A1 * | 3/2007 | Bedi | ....................... | H04L 67/26 709/204 |
| 2007/0088711 A1 * | 4/2007 | Craggs | ................... | G06Q 10/10 |
| 2008/0134202 A1 * | 6/2008 | Craggs | ................... | G06F 9/542 719/313 |

(Continued)

OTHER PUBLICATIONS

Wikipedia, "IF-MAP", http://en.wikipedia.org/wiki/IF-MAP, Nov. 25, 2013, 3 pages.

(Continued)

*Primary Examiner* — Mohamed Wasel
(74) *Attorney, Agent, or Firm* — Harrity & Harrity, LLP

(57) ABSTRACT

A publication exchange device may receive information that identifies a subscriber device, and may receive a set of subscription keys associated with subscribed-to network event information to be provided to the subscriber device. The publication exchange device may receive published network event information from one or more publisher devices, and may determine that the published network event information includes information that matches the set of subscription keys. The publication exchange device may identify the subscribed-to network event information, from the published network event information, using the set of subscription keys. The publication exchange device may provide the subscribed-to network event information to the subscriber device based on identifying the subscribed-to network event information.

20 Claims, 10 Drawing Sheets

(56) References Cited

U.S. PATENT DOCUMENTS

2010/0162260 A1* 6/2010 Ibrahim .................. G06F 9/505
                                                      718/105
2014/0067940 A1* 3/2014 Li .......................... H04L 67/22
                                                      709/204

OTHER PUBLICATIONS

Wikipedia, "Memcached", http://en.wikipedia.org/wiki/Memcached, Apr. 21, 2014, 5 pages.
Wikipedia, "Redis", http://en.wikipedia.org/wiki/Redis, Apr. 22, 2014, 6 pages.

* cited by examiner

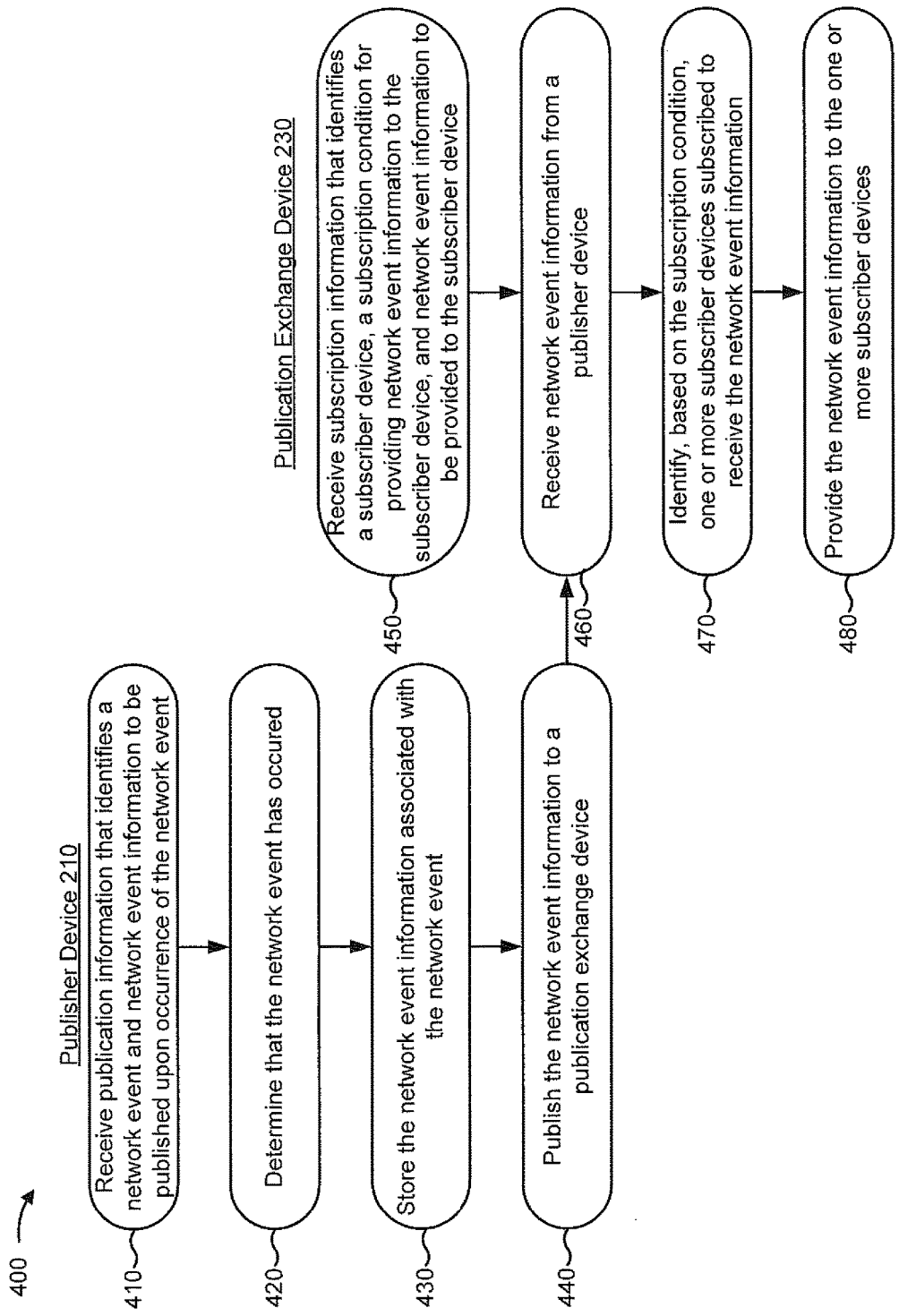

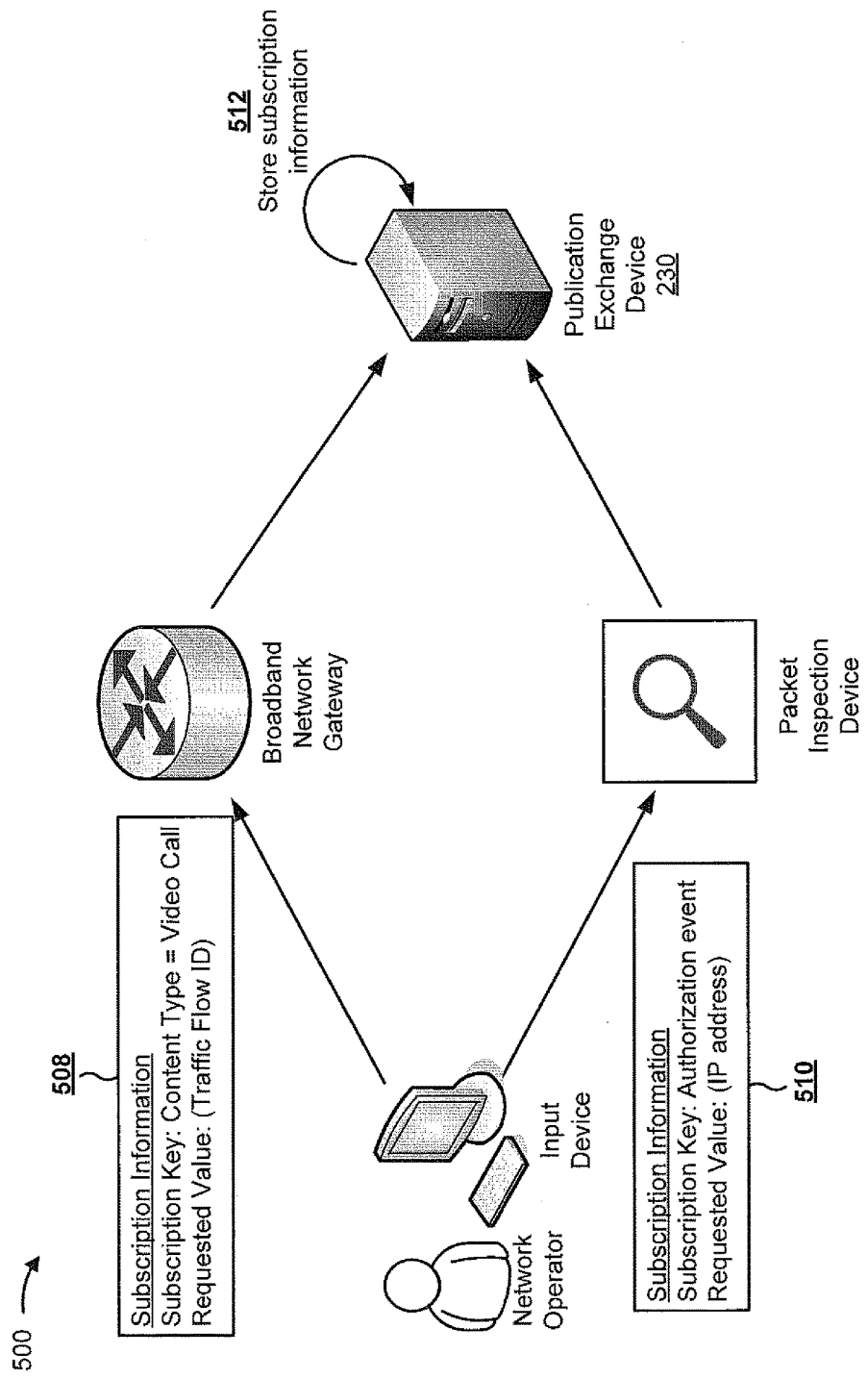

PUBLISH-SUBSCRIBE BASED EXCHANGE FOR NETWORK SERVICES

BACKGROUND

Network Functions Virtualization (NFV) is a network architecture concept for virtualizing entire classes of network node functions into building blocks that may be connected, or chained, together to create communication services.

SUMMARY

According to some possible implementations, a device may receive information that identifies a subscriber device, and may receive information that identifies subscribed-to network event information to be provided to the subscriber device. The device may receive information that identifies a subscription condition for providing the subscribed-to network event information to the subscriber device, and may receive published network event information from a publisher device. The published network event information may include at least a portion of the subscribed-to network event information. The device may determine, based on the subscription condition and further based on receiving the published network event information, that the subscriber device is subscribed to receive the subscribed-to network event information. The device may provide the subscribed-to network event information to the subscriber device based on determining that the subscriber device is subscribed to receive the subscribed-to network event information. The subscribed-to network event information may cause the subscriber device to use the subscribed-to network event information to provide a network service.

According to some possible implementations, a computer-readable medium may store instructions that, when executed by a processor, cause the processor to receive information that identifies a first subscriber device, and receive information that identifies first subscribed-to network event information to be provided to the first subscriber device. The instructions may cause the processor to receive information that identifies a second subscriber device that is different from the first subscriber device, and receive information that identifies second subscribed-to network event information to be provided to the second subscriber device. The second subscribed-to network event information may be different from the first subscribed-to network event information. The instructions may cause the processor to receive published network event information from a publisher device, determine that the published network event information includes the first subscribed-to network event information, and determine that the first subscriber device is subscribed to receive the first subscribed-to network event information. The instructions may cause the processor to provide the first subscribed-to network event information to the first subscriber device based on determining that the first subscriber device is subscribed to receive the first subscribed-to network event information. The first subscribed-to network event information may cause the first subscriber device to use the first subscribed-to network event information to provide a network service associated with the first subscribed-to network event information.

According to some possible implementations, a method may include receiving, by a publication exchange device, information that identifies a subscriber device. The method may include receiving, by the publication exchange device, a set of subscription keys associated with subscribed-to network event information to be provided to the subscriber device. The method may include receiving, by the publication exchange device, published network event information from a publisher device. The method may include determining, by the publication exchange device, that the published network event information includes information that matches the set of subscription keys. The method may include identifying, by the publication exchange device, the subscribed-to network event information, from the published network event information, using the set of subscription keys. The method may include providing, by the publication exchange device, the subscribed-to network event information to the subscriber device based on identifying the subscribed-to network event information.

BRIEF DESCRIPTION OF THE DRAWINGS

FIG. 4 is a flow chart of an example process for using a publish-subscribe model to exchange network event information for network services; and FIGS. 5A-5F are diagrams of an example implementation relating to the example process shown in FIG. 4.

DETAILED DESCRIPTION

The following detailed description of example implementations refers to the accompanying drawings. The same reference numbers in different drawings may identify the same or similar elements.

A service provider may provide a network service (e.g., a network address translation service, a uniform resource locator (URL) filtering service, an anti-malware service, etc.) to a subscribing user and/or network traffic associated with the subscribing user. A service provider may use specialized hardware to provide such a network service. However, the specialized hardware may be expensive and complex to manage. Thus, a service provider may want to use network functions virtualization (NFV) to implement the network service using software executing on inexpensive hardware. The use of NFV may lead to an increase in the quantity and type of network services that can be provided, making management of such network services difficult. Implementations described herein provide a way to simplify the management of network services implemented via NFV using a publish-subscribe model to exchange network event information used to deploy the network services.

Figure 1:
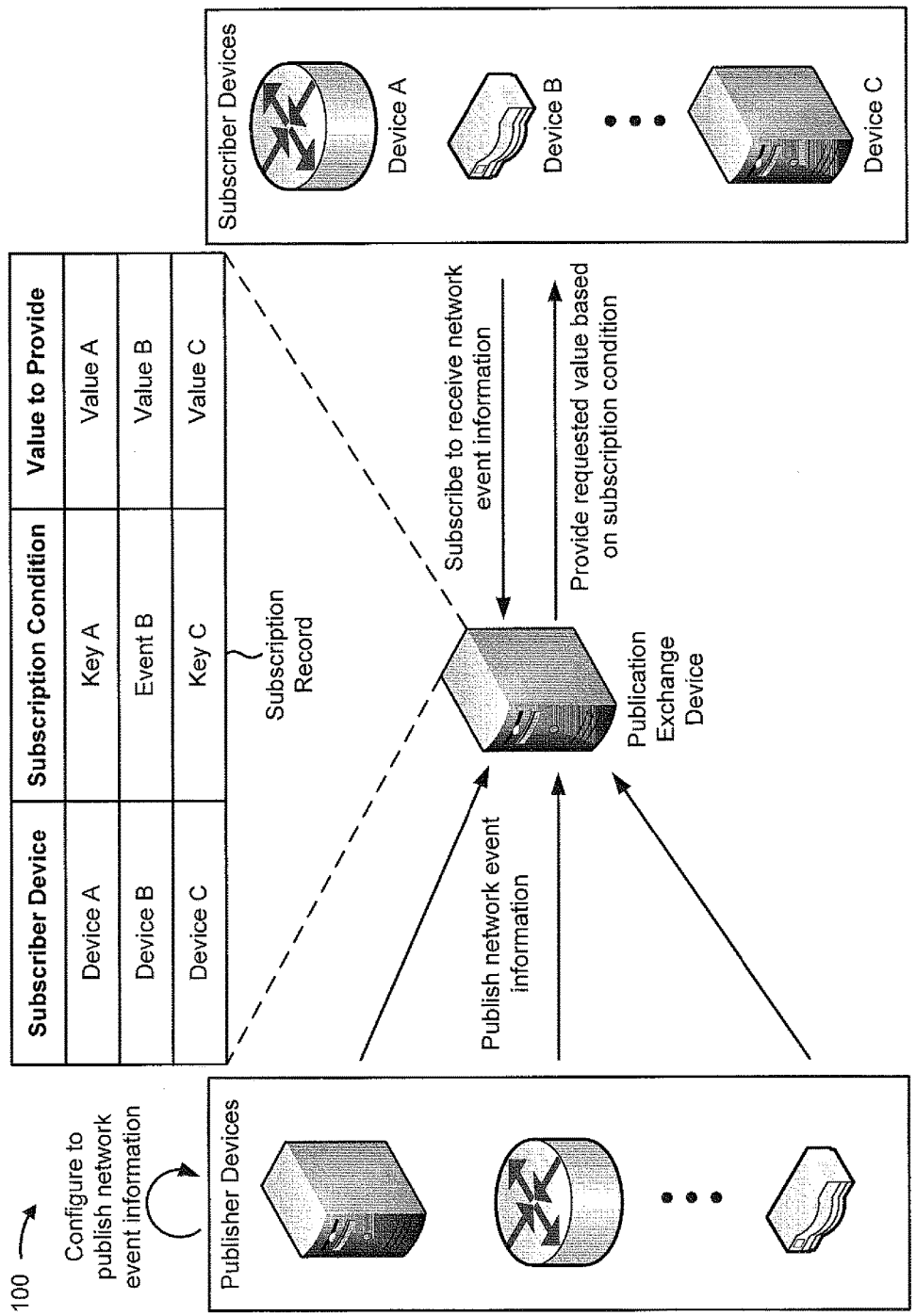
FIG. 1 is a diagram of an overview of an example implementation described herein.

FIG. 1 is a diagram of an overview of an example implementation 100 described herein. As shown in FIG. 1, a variety of publisher devices may be configured to publish network event information when a network event occurs, such as a login event, an authorization event, or another similar type of network event. When a network event associated with a publisher device occurs, the publisher device may provide network event information to a publication exchange device.

As further shown in FIG. 1, a variety of subscriber devices may subscribe to receive network event information published by the publisher devices. As shown, the publication exchange device may store a subscription record that identifies a subscriber device, a subscription condition that identifies an event that triggers published network event information to be provided to the subscriber device, and a value that identifies network event information to be provided to the subscriber device when the event occurs. As further shown, the publication exchange device may use the subscription record to provide published network event information to subscriber devices. The subscriber devices may use the network event information to deploy various network services. In this way, the publication exchange device may manage the performance of network services by handling information transfers between the publisher devices and the subscriber devices.

Figure 2:
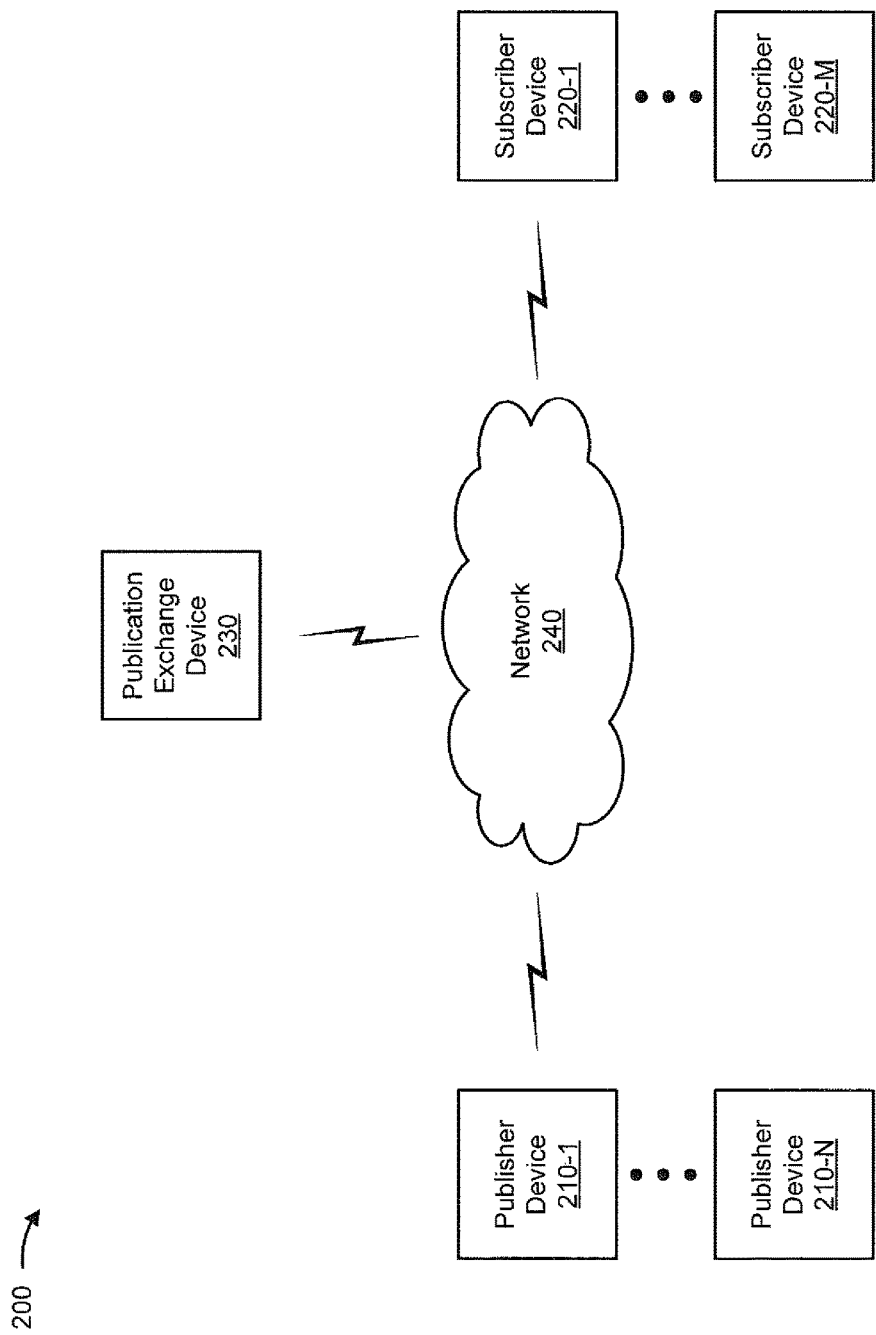
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a set of publisher devices 210-1 through 210-N (N≥1) (hereinafter referred to collectively as "publisher devices 210," and individually as "publisher device 210"), a set of subscriber devices 220-1 through 220-M (M≥1) (hereinafter referred to collectively as "subscriber devices 220," and individually as "subscriber device 220"), a publication exchange device 230, and a network 240. Devices of environment 200 may interconnect via wired connections, wireless connections, or a combination of wired and wireless connections.

Publisher device 210 may include one or more devices capable of receiving, generating, storing, processing, and/or providing network event information. For example, publisher device 210 may include a network device (e.g., a device capable of communicating via network 240), such as a computer, a router, a gateway, a switch, a hub, a bridge, a server device, a firewall, an intrusion detection device, a packet inspection device, or the like. Publisher device 210 may receive and/or capture network event information associated with a specified network event, and may provide (e.g., publish) the network event information to publication exchange device 230.

Subscriber device 220 may include one or more devices capable of receiving, storing, and/or processing network event information associated with a subscription of subscriber device 220. For example, subscriber device 220 may include a network device (e.g., a device capable of communicating via network 240), such as a computer, a router, a gateway, a switch, a hub, a bridge, a server device, a firewall, an intrusion detection device, a packet inspection device, or the like. Subscriber device 220 may provide subscription information to publication exchange device 230. The subscription information may identify network event information to be provided to subscriber device 220 upon the occurrence of a network event (e.g., based on publication exchange device 230 receiving the network event information from publisher device 210). Subscriber device 220 may receive subscribed-to network event information from publication exchange device 230.

While shown in FIG. 2 as being separate devices, publisher device 210 and subscriber device 220 may be implemented in a single device, in some implementations. For example, a single device may both publish network event information to publication exchange device 230 and receive subscribed-to network event information (e.g., different from the published network event information) from publication exchange device 230. In some implementations, a device may use subscribed-to network event information to generate and publish other network event information.

Publication exchange device 230 may include one or more devices capable of receiving, storing, processing, and/or providing network event information. For example, publication exchange device 230 may include a network device (e.g., a device capable of communicating via network 240), such as a computer, a router, a gateway, a switch, a hub, a bridge, a server device, a firewall, an intrusion detection device, a packet inspection device, or the like. Publication exchange device 230 may receive published network event information from one or more publisher devices 210, and may receive subscription information from one or more subscriber devices 220. Publication exchange device 230 may use the subscription information to identify subscribed-to network event information, included in the published network event information, to be provided to subscriber device(s) 220, and may provide the subscribed-to network event information to subscriber device(s) 220.

While shown in FIG. 2 as being a single device, publication exchange device 230 may be implemented as multiple devices, in some implementations. For example, multiple publication exchange devices 230 may be used to provide backup in case a single publication exchange device 230 experiences an error. In this case, information stored by publication storage device 230 may be replicated across multiple publication storage devices 230. Additionally, or alternatively, publication exchange device 230 may be implemented with publisher device 210 and/or subscriber device 220 as a single device.

In some implementations, publisher device 210, subscriber device 220, and/or publication exchange device 230 may utilize one or more mechanisms to enhance performance and/or scaling requirements (e.g., for service provider networks). For example, information may be transmitted between publication exchange device 230 and other devices (e.g., publisher device 210, subscriber device 220, etc.) using a low latency user datagram protocol (UDP). Additionally, or alternatively, devices of environment 200 may store information described herein in an in-memory database. Additionally, or alternatively, devices of environment 200 may store information described herein using a distributed hash table. For example, multiple publication exchange devices 230 may utilize a distributed hash table to store information.

Network 240 may include one or more wired and/or wireless networks. For example, network 240 may include a cellular network (e.g., a long-term evolution (LTE) network, a third generation (3G) network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
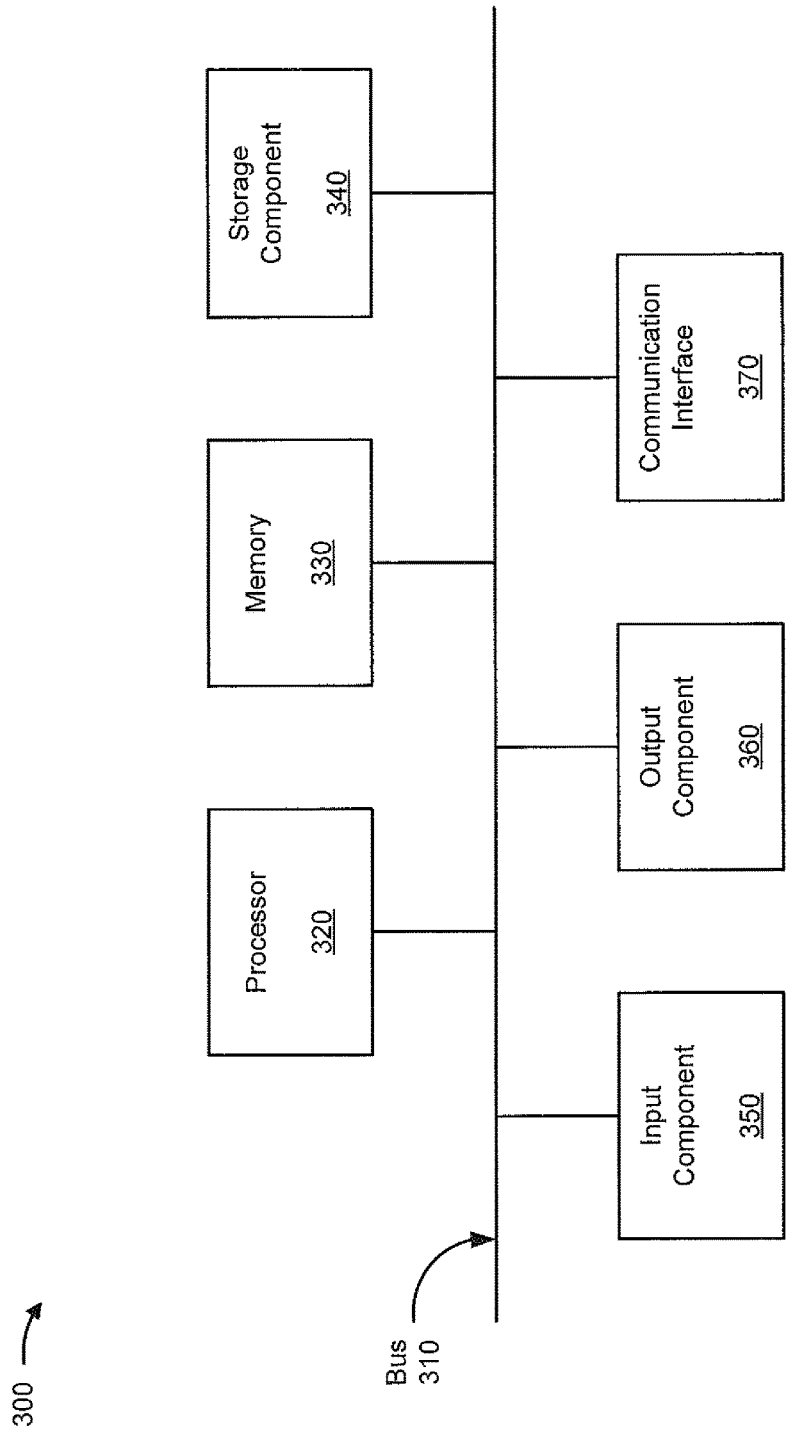
FIG. 3 is a diagram of example components of one or more devices of FIG. 2.

FIG. 3 is a diagram of example components of a device 300. Device 300 may correspond to publisher device 210, subscriber device 220, and/or publication exchange device 230. In some implementations, publisher device 210, subscriber device 220, and/or publication exchange device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for using a publish-subscribe model to exchange network event information for network services. In some implementations, one or more process blocks of FIG. 4 may be performed by publisher device 210 and/or publication exchange device 230. In some implementations, one or more process blocks of FIG. 4 may be performed by another device or a group of devices separate from or including publisher device 210 and/or publication exchange device 230, such as subscriber device 220.

As shown in FIG. 4, process 400 may include receiving publication information that identifies a network event and network event information to be published upon occurrence of the network event (block 410). For example, publisher device 210 may receive publication information, such as via input provided by a user (e.g., a network operator) and/or input received from another device. The publication information may identify a network event, and may identify network event information to be published upon occurrence of the network event.

A network event may include an event associated with a network, a network service, a network resource, an application, a set of traffic flows, a set of packets, a network functions virtualization service, etc. For example, a network event may include a login event (e.g., a user login, a device login, etc.), a registration event (e.g., a user registration, a device registration, etc.), an authentication event (e.g., a user authentication, a device authentication, etc.), an authorization event (e.g., a user authorization, a device authorization, etc.), a network attack (e.g., a denial-of-service attack, a hacking attempt, a security breach, etc.), a traffic flow event (e.g., establishment of a traffic flow, termination of a traffic flow, detection of a traffic flow that satisfies a set of conditions, etc.), a routing event (e.g., routing a packet to a particular destination, receiving a packet from a particular source, etc.), a service event (e.g., providing a particular service, such as a network address translation service, a packet filtering service, etc.), or a similar type of network event. In some implementations, a network event may be defined by a set of publication conditions being satisfied, and the publication information may identify the set of publication conditions.

Network event information may include information associated with a network event. For example, network event information may include identifying information associated with the network event (e.g., a user identifier, a device identifier, a traffic flow identifier, a packet identifier, a service identifier, etc.). Additionally, or alternatively, network event information may include time information associated with the network event (e.g., information identifying a date and/or a time at which the network event occurred, at which other network event information was captured, etc.).

Additionally, or alternatively, network event information may include traffic flow information (e.g., information identifying a source network address, a source port, a destination network address, a destination port, a protocol, a payload, a quality of service parameter, etc., associated with a packet and/or a traffic flow).

As an example, network event information may include information that identifies a user, information that identifies a set of services that the user is to receive (e.g., services to which the user is registered), information that identifies a content type of content being accessed and/or included in a packet (e.g., a video call, a voice call, video content, audio content, email content, peer-to-peer content, content associated with a particular application, etc.), information that identifies an application being accessed, information that identifies a manner in which traffic, associated with a user and/or a packet, is to be treated (e.g., a quality of service parameter associated with a packet), etc.

Publisher device 210 may receive the publication information, identifying the network event and the network event information, and may store the publication information. Publisher device 210 may use the publication information to publish network event information to publication exchange device 230.

As further shown in FIG. 4, process 400 may include determining that the network event has occurred (block 420), storing the network event information associated with the network event (block 430), and publishing the network event information to a publication exchange device (block 440). For example, publisher device 210 may determine that the network event has occurred, and may store network event information associated with the network event. In some implementations, publisher device 210 may determine that the network event has occurred based on determining that a set of publication conditions, associated with the network event, have been satisfied. For example, publisher device 210 may be configured such that when publisher device 210 detects a login attempt (e.g., every time a user attempts to log in to access a resource using publisher device 210), publisher device 210 stores a record of the login attempt, a user identifier associated with the login attempt (e.g., a username), a time of the login attempt, and information that identifies whether the login attempt was successful.

Publisher device 210 may provide the recorded network event information to publication exchange device 230. In some implementations, publisher device 210 may provide the information to publication exchange device 230 within a threshold amount of time after storing the information. Additionally, or alternatively, publisher device 210 may periodically provide recorded network event information to publication exchange device 230. In some implementations, publisher device 210 may aggregate network event information associated with multiple network events, and may provide the aggregated network event information to publication exchange device 230 at a predetermined time.

As further shown in FIG. 4, process 400 may include receiving subscription information that identifies a subscriber device, a subscription condition for providing network event information to the subscriber device, and network event information to be provided to the subscriber device (block 450). For example, publication exchange device 230 may receive subscription information, such as via input provided by a user (e.g., a network operator) and/or input received from another device. In some implementations, publication exchange device 230 may receive the subscription information from subscriber device 220. The subscription information may identify a particular subscriber device 220, a subscription condition for providing subscribed-to network event information to the particular subscriber device 220, and subscribed-to network event information to be published to the particular subscriber device 220.

In some implementations, the subscription information may include a device identifier that identifies subscriber device 220. For example, the device identifier may include a network address, such as an internet protocol (IP) address, a media access control (MAC) address, or other information that may be used to identify and/or locate subscriber device 220 (e.g., on a network).

Additionally, or alternatively, the subscription information may identify a subscription condition for providing subscribed-to network event information to the identified subscriber device 220. Additionally, or alternatively, the subscription information may identify subscribed-to network event information to be provided to subscriber device 220 when the subscription condition is satisfied. In some implementations, publication exchange device 230 may determine that a subscription condition is satisfied when publication exchange device 230 receives (e.g., from publisher device 210) and/or stores information that matches one or more subscription keys.

As an example, a subscription key may identify a set of information, such as information that identifies a login attempt, a user identifier associated with the login attempt, a time of the login attempt, and information that identifies whether the login attempt was successful. When publication exchange device 230 receives and/or stores this set of information, publication exchange device 230 may provide this set of information (e.g., or a subset of this set of information, or other information, or a combination of some of this information and some other information, etc.) to subscriber device 220.

As further shown in FIG. 4, process 400 may include receiving network event information from a publisher device (block 460), identifying, based on the subscription condition, one or more subscriber devices subscribed to receive the network event information (block 470), and providing the network event information to the one or more subscriber devices (block 480). For example, publication exchange device 230 may receive published network event information from one or more publisher devices 210 (e.g., as described herein in connection with blocks 410-440). Based on receiving the published network event information, publication exchange device 230 may use a subscription condition to determine subscriber device(s) 220 subscribed to receive subscribed-to network event information included in and/or associated with the published network event information, and may provide the subscribed-to network event information to subscriber device(s) 220.

In some implementations, publication exchange device 230 may compare the published network event information to a set of subscription keys identified by a subscription condition. For example, a subscription condition may specify that when published network event information indicates that a login attempt occurred, that publication exchange device 230 is to provide login information, associated with the login attempt (e.g., a time of the login attempt, a user identifier for the login attempt, etc.), to subscriber device(s) 220.

Additionally, or alternatively, the subscription condition may identify subscription keys, such as a time of a login attempt (e.g., a subscription key of LoginTime), a user identifier for the login attempt (e.g., a subscription key of Username), and information indicating whether the login attempt was successful (e.g., a subscription key of LoginSuccess). When publication exchange device 230 receives published network event information, publication exchange device 230 may determine whether the published network event information includes these subscription keys (e.g., LoginTime, Username, and LoginSuccess). If the published network event information includes these subscription keys, then publication exchange device 230 may provide respective values, associated with each subscription key, to subscriber device(s) 220. For example, a value of "5/5/2014, 10:00" may be associated with the subscription key for a time of the login attempt (e.g., "LoginTime=5/5/2014; 10:00"), a value of "UserA" may be associated with the subscription key for a user identifier (e.g., "Username=UserA"), and a value of "TRUE" may be associated with the subscription key indicating success of the login attempt (e.g., "LoginSuccess=TRUE"). Publication exchange device 230 may send these values and/or the corresponding subscription keys to subscriber device(s) 220.

Publication exchange device 230 and/or multiple publication exchange devices 230 may store the published network event information using a distributed hash table, in some implementations. Additionally, or alternatively, publication exchange device 230 may store the published network event information as a key-value pair. In this way, any publication exchange device 230 may retrieve a value associated with a key, and the information may be hashed to reduce an amount of storage space required to store the information. Additionally, or alternatively, publication exchange device 230 may store links between different published network event information records. For example, publication exchange device 230 may link different records that share the same value for a key (e.g., are associated with the same Internet Protocol (IP) address, the same user identifier, etc.). In this way, publication exchange device 230 may easily identify related network event information to be provided to subscriber device(s) 220.

Publication exchange device 230 may provide subscribed-to network event information to subscriber device(s) 220 based on receiving published network event information and identifying that the published network event information (or some other information) is to be provided to subscriber device(s) 220. Publication exchange device 230 may provide the published network event information received from publisher device 210, may provide a subset of the published network event information received from publisher device 210, may provide other published network event information received from another publisher device 210, may combine published network event information from multiple publisher devices 210 and provide the combined information, may provide other published network event information stored by publication exchange device 230, or may provide some combination of this or other types of information to subscriber device(s) 220.

In some implementations, publication exchange device 230 may provide subscribed-to network event information to subscriber device(s) 220 within a threshold amount of time after receiving the network event information. Additionally, or alternatively, publication exchange device 230 may periodically provide subscribed-to network event information to subscriber devices 220(s) (e.g., once per minute, once per hour, once per day, etc.). Additionally, or alternatively, publication exchange device 230 may provide, to subscriber device(s) 220, an indication that subscribed-to network event information is available, and subscriber device(s) 220 may request the subscribed-to network event information based on the indication (e.g., during a time period when subscriber device(s) 220 is associated with an amount of network traffic below a threshold). Additionally, or alternatively, publication exchange device 230 may provide the subscribed-to network event information based on a request from subscriber device(s) 220.

Additionally, or alternatively, subscriber device 220 may query publication exchange device 230 for network event information. For example, a request from subscriber device 220 may identify a date and/or a time of a most recent update to subscriber device 220, and publication exchange device 230 may provide subscribed-to network event information that has been added and/or modified (e.g., in a data structure stored by publication exchange device(s) 230) since the most recent update. Additionally, or alternatively, publication exchange device 230 may provide all stored subscribed-to network event information, that matches a subscription condition (e.g., that includes values that correspond to a set of subscription keys), to subscriber device(s) 220. In this way, a new subscriber device 220 (e.g., that has been connected to a network) or a subscriber device 220 undergoing data recovery may receive all relevant subscribed-to network event information from publication exchange device 230.

In some implementations, publication exchange device 230 may store a relationship between a subscription condition (e.g., a set of subscription keys) and a device identifier of a subscriber device 220. Thus, when a particular subscription condition is satisfied, publication exchange device 230 may identify a subscriber device 220 to which to send network event information. In this way, publication exchange device 230 may manage a manner in which network event information is shared among different devices that provide network services.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5F are diagrams of an example implementation 500 relating to example process 400 shown in FIG. 4. FIGS. 5A-5F show an example of using a publish-subscribe model to exchange network event information for network services.

Figure 5A:
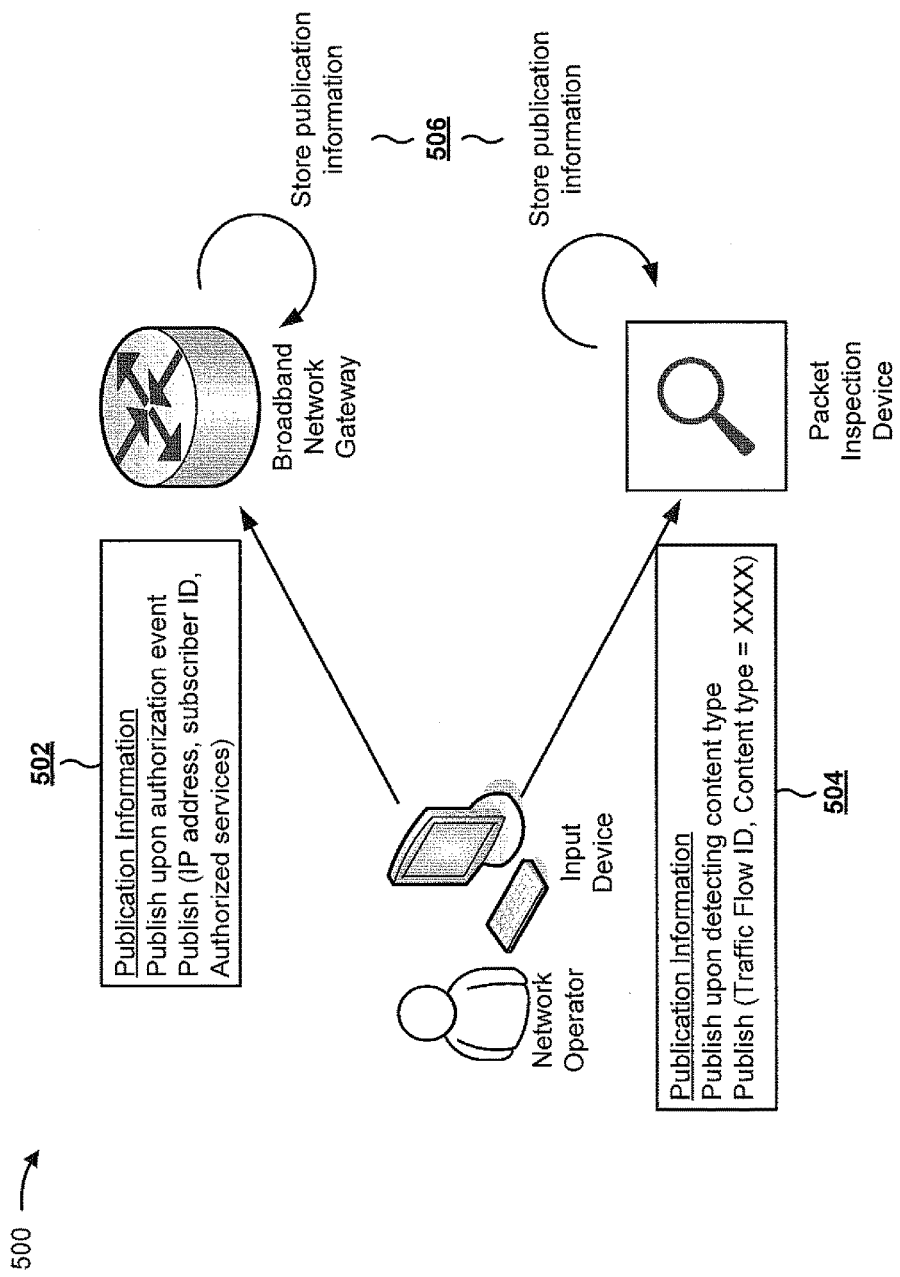

As shown in FIG. 5A, and by reference number 502, assume that a network operator interacts with an input device (e.g., a desktop computer, a laptop computer, a tablet computer, etc.) to provide publication information to a broadband network gateway, which acts as a publisher device 210. As shown, assume that the publication information identifies a publication condition, shown as a publish upon authorization event, and network event information to be published, shown as an IP address, a subscriber identifier (ID), and information that identifies authorized services that a subscribing user is authorized to receive.

As shown by reference number 504, assume that the network operator further interacts with the input device to provide publication information to a packet inspection device, which also acts as a publisher device 210. As shown, assume that the publication information identifies a publication condition, shown as publish upon detecting a content type, and network event information to be published, shown as a traffic flow ID and information that identifies a content type associated with the traffic flow ID.

As shown by reference number 506, assume that the broadband network gateway and the packet inspection device store the respective publication information. In this way, the broadband network gateway and the packet inspection device can publish respective network event information to publication exchange device 230 when the broadband network gateway and/or the packet inspection device detect a respective publication condition.

As shown in FIG. 5B, and by reference number 508, further assume that the network operator interacts with the input device to provide subscription information to the broadband network gateway, which acts as a subscriber device 220 in addition to acting as a publisher device 210. As shown, assume that the subscription information identifies a subscription condition (e.g., a subscription key) and a requested value, which together indicate that publication exchange device 230 is to provide, to the broadband network gateway, information identifying a traffic flow ID when publication exchange device 230 receives information identifying that the traffic flow ID is associated with a video call (e.g., when the subscription key of "Content Type" has a value of "Video Call").

As shown by reference number 510, further assume that the network operator interacts with the input device to provide subscription information to the packet inspection device, which acts as a subscriber device 220 in addition to acting as a publisher device 210. As shown, assume that the subscription information identifies a subscription condition (e.g., a subscription key) and a requested value, which together indicate that publication exchange device 230 is to provide, to the packet inspection device, information identifying an IP address when publication exchange device 230 receives information indicating that an authorization event associated with the IP address has occurred (e.g., "Authorization=True").

As shown by reference number 512, assume that the broadband network gateway and the packet inspection device provide the subscription information to publication exchange device 230, and publication exchange device 230 stores the subscription information (e.g., information identifying a device, a subscription condition, and a requested value). In some cases, publication exchange device 230 may receive the subscription information from the input device, rather than from the broadband network gateway and the packet inspection device.

Figure 5C:
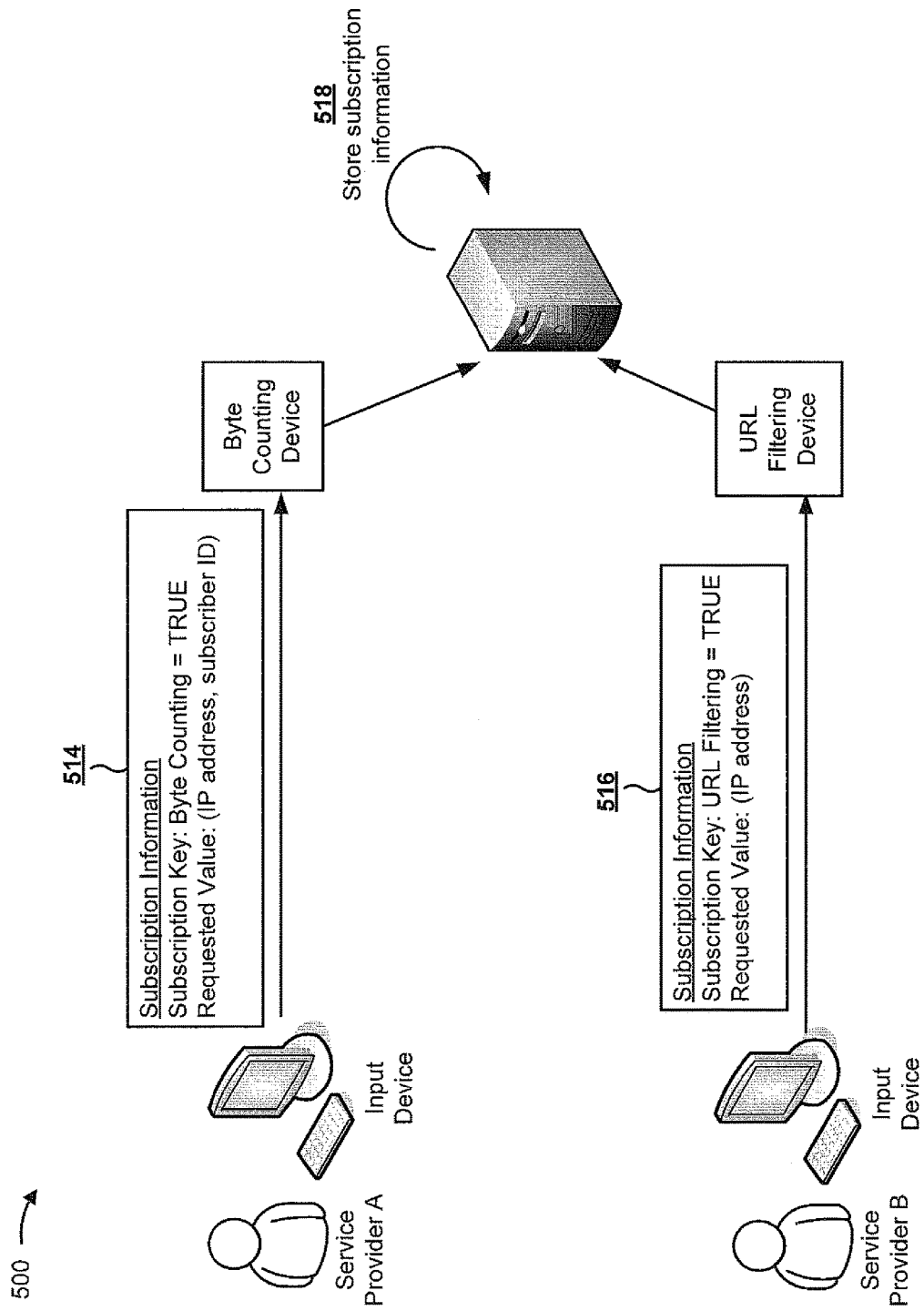

As shown in FIG. 5C, and by reference number 514, assume that a service provider, shown as Service Provider A, interacts with an input device (e.g., a desktop computer, a laptop computer, a tablet computer, etc.) to provide subscription information to a byte counting device (e.g., which acts as a subscriber device 220) that provides a byte counting service associated with Service Provider A. As shown, assume that the subscription information identifies a subscription condition (e.g., a subscription key) and a requested value, which together indicate that publication exchange device 230 is to provide, to the byte counting device, information identifying an IP address and a subscriber ID when publication exchange device 230 receives information identifying that a byte counting service is to be provided in connection with the IP address and/or the subscriber ID (e.g., when publication exchange device 230 receives information indicating that "Byte Counting=TRUE").

As shown by reference number 516, assume that another service provider, shown as Service Provider B, interacts with an input device to provide subscription information to a uniform resource locator (URL) filtering device (e.g., which acts as a subscriber device 220) that provides a URL filtering service associated with Service Provider B. As shown, assume that the subscription information identifies a subscription condition (e.g., a subscription key) and a requested value, which together indicate that publication exchange device 230 is to provide, to the URL filtering device, information identifying an IP address when publication exchange device 230 receives information identifying that a URL filtering service is to be provided in connection with the IP address (e.g., when publication exchange device 230 receives information indicating that "URL Filtering=TRUE").

As shown by reference number 518, assume that the byte counting device and the URL filtering device provide the subscription information to publication exchange device 230, and publication exchange device 230 stores the subscription information (e.g., information identifying a device, a subscription condition, and a requested value). In some cases, publication exchange device 230 may receive the subscription information from each input device, rather than from the byte counting device and the URL filtering device.

Figure 5D:
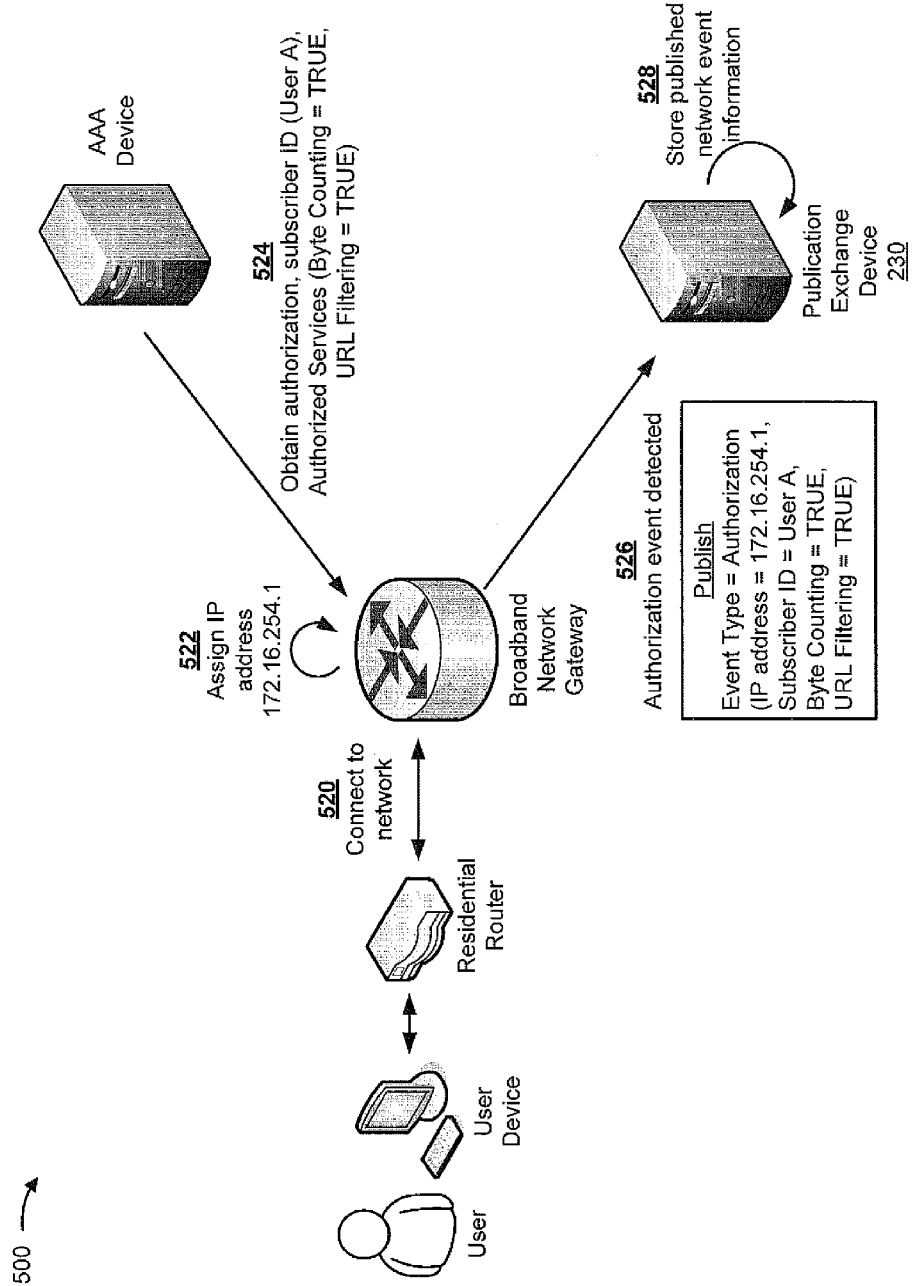

As shown in FIG. 5D, and by reference number 520, assume that a user interacts with a user device (e.g., a mobile phone, a laptop computer, etc.), via a residential router, to connect to a network using the broadband network gateway. As shown by reference number 522, assume that the broadband network gateway assigns an IP address of "172.16.254.1" to the residential router, and obtains authorization information from an authentication, authorization, and accounting (AAA) device. As shown by reference number 524, assume that the authorization information includes a subscriber ID, shown as "User A," that identifies the user, and information identifying a set of authorized services to be applied to traffic associated with the user, shown as "Byte Counting=TRUE" and "URL Filtering=TRUE."

As shown by reference number 526, assume that the broadband network gateway detects that an authorization event has occurred, and provides publishes network event information to publication exchange device 230 based on detecting the authorization event. As shown, assume that the network event information identifies an event type that triggered the publication (e.g., "Event Type=Authorization"), an IP address associated with the authorization event (e.g., "172.16.254.1"), a subscriber ID associated with the authorization event (e.g., "User A"), and information identifying authorized services (e.g., "Byte Counting=TRUE" and "URL Filtering=TRUE"). As shown by reference number 528, assume that publication exchange device 230 stores the published network event information.

Figure 5E:
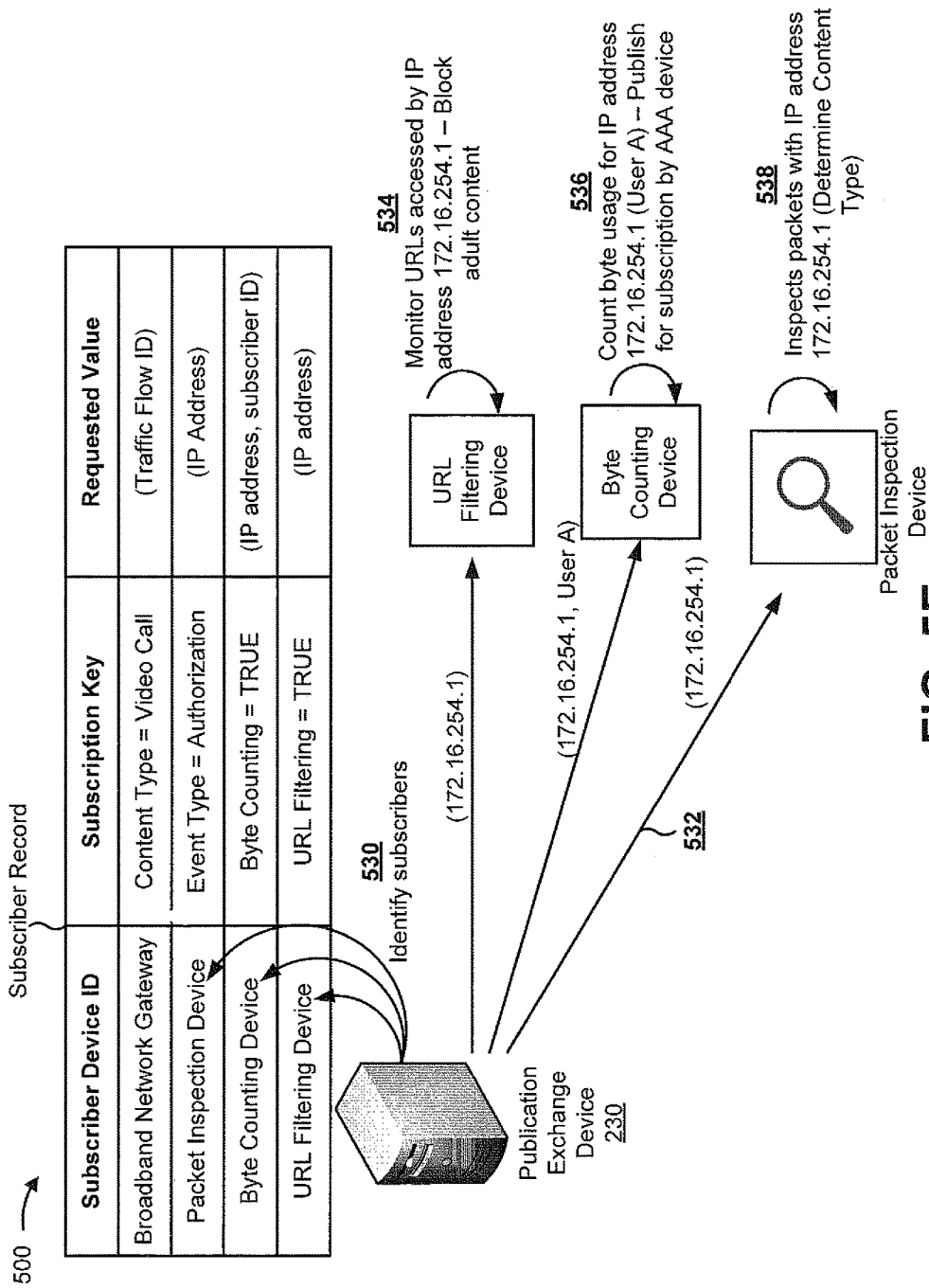

As shown in FIG. 5E, and by reference number 530, based on receiving the published network event information, assume that publication exchange device 230 searches a subscriber record to identify subscriber devices 220 subscribed to receive subscribed-to network event information included in the published network event information. As shown, assume that publication exchange device 230 determines that an IP address, included in the published network event information, is to be sent to the packet inspection device because the subscription condition of "Event Type=Authorization" is satisfied. Further, assume that publication exchange device 230 determines that an IP address and a subscriber ID, included in the published network event information, are to be sent to the byte counting device because the subscription condition of "Byte Counting=TRUE" is satisfied. Finally, assume that publication exchange device 230 determines that an IP address, included in the published network event information, is to be sent to the URL filtering device because the subscription condition of "URL Filtering=TRUE" is satisfied.

As shown by reference number 532, assume that publication exchange device 230 provides information identifying the IP address of "172.16.254.1" to the packet inspection device and the URL filtering device, and further provides information identifying the IP address of "172.16.254.1" and the subscriber ID of "User A" to the byte counting device.

Subscriber devices 220 may use the network event information to provide one or more network services. For example, as shown by reference number 534, assume that the URL filtering device monitors URLs accessed by a device with an IP address of "172.16.254.1," and blocks URLs associated with adult content. Further, as shown by reference number 536, assume that the byte counting device counts byte usage for the IP address "172.16.254.1," which is associated with User A, and publishes the byte usage for User A to publication exchange device 230 for subscription by the AAA device. Finally, as shown by reference number 538, assume that the packet inspection device inspects packets with an IP address of "172.16.254.1" to determine a content type associated with content included in the packets.

Figure 5F:
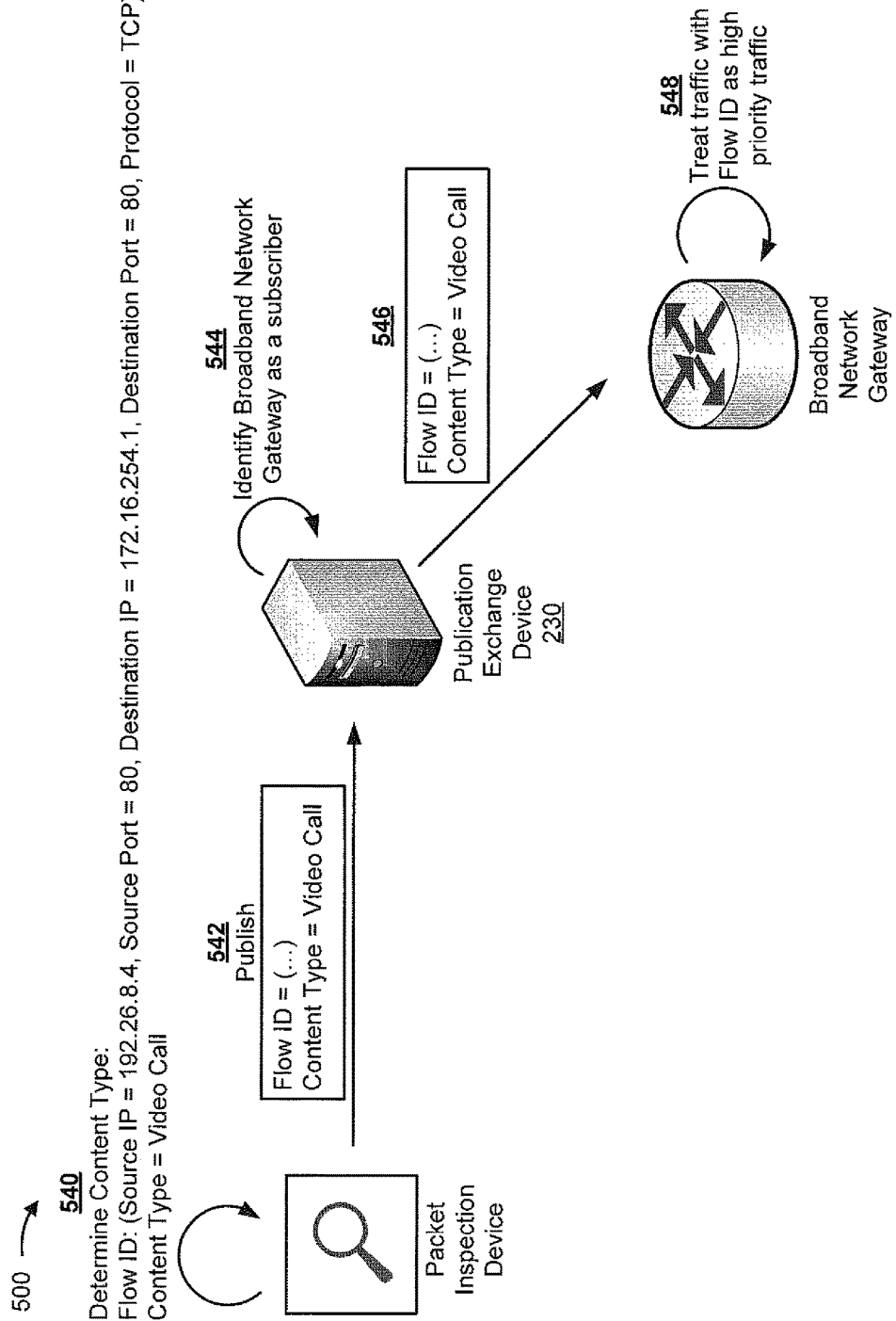

As shown in FIG. 5F, and by reference number 540, assume that the packet inspection device determines a content type of content included in packets associated with the IP address of "172.16.254.1," and records a flow ID and the content type. For example, assume that the packet inspection device records a flow ID using a source IP address of a packet (e.g., "192.26.8.4"), a source port of the packet (e.g., "80"), a destination IP address of the packet (e.g., "172.16.254.1"), a destination port of the packet (e.g., "80"), and a protocol of the packet (e.g., "TCP"). Further, assume that the packet inspection device determines a content type of "Video Call" for content included in the packet.

As shown by reference number 542, assume that the packet inspection device publishes the network event information, to publication exchange device 230, based on determining the content type. For example, assume that the packet inspection device provides information identifying the flow ID and the content type to publication exchange device 230. As shown by reference number 544, assume that publication exchange device 230 identifies the broadband network gateway as a subscriber to the published network event information. As shown by reference number 546, assume that publication exchange device 230 provides the flow ID and information identifying the content type to the broadband network gateway. Based on receiving this subscribed-to network event information, assume that the broadband network gateway treats traffic with this flow ID as high priority traffic. In this way, publication exchange device 230 may assist subscriber devices 220 in providing a sequence of services (e.g., in the proper sequence) via a service chain.

As indicated above, FIGS. 5A-5F are provided merely as an example. Other examples are possible and may differ from what was described with regard to FIGS. 5A-5F.

Implementations described herein provide a way to simplify the management of network services (e.g., service implemented via NFV) using a publish-subscribe model to exchange network event information used to deploy the network services.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

As used herein, a packet may refer to a network packet, a frame, a datagram, a segment, a fragment of a packet, a fragment of a frame, a fragment of a datagram, a fragment of a segment, or any other formatted or unformatted unit of data capable of being transmitted via a network.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive information that identifies a subscriber device;
receive information that identifies subscribed-to network event information to be provided to the subscriber device;
receive information that identifies a subscription condition for providing the subscribed-to network event information to the subscriber device,
the subscription condition identifying a subscription key;
receive published network event information from a publisher device,
the published network event information including at least a portion of the subscribed-to network event information;

determine that the published network event information includes information that matches the subscription key;
identify a value associated with the subscription key;
identify the subscribed-to network event information based on identifying the value associated with the subscription key; and
provide the subscribed-to network event information to the subscriber device based on determining that the published network event information includes information that matches the subscription key,
the subscribed-to network event information causing the subscriber device to use the subscribed-to network event information to provide a network service.

2. The device of claim 1, where the one or more processors, when determining that the subscriber device is subscribed to receive the subscribed-to network event information, are further to:
determine that a plurality of subscriber devices, including the subscriber device, are subscribed to receive the subscribed-to network event information; and
where the one or more processors, when providing the subscribed-to network event information to the subscriber device, are further to:
provide the subscribed-to network event information to the plurality of subscriber devices.

3. The device of claim 1,
where the subscriber device is a first subscriber device;
where the subscribed-to network event information is first subscribed-to network event information;
where the one or more processors are further to:
determine that the first subscriber device is subscribed to receive the first subscribed-to network event information;
determine that a second subscriber device is subscribed to receive second subscribed-to network event information,
the second subscriber device being different than the first subscriber device, and
the second subscribed-to network event information being included in the published network event information and being different than the first subscribed-to network event information; and
where the one or more processors, when providing the subscribed-to network event information to the subscriber device, are to:
provide the first subscribed-to network event information to the first subscriber device; and
provide the second subscribed-to network event information to the second subscriber device.

4. The device of claim 1,
where the one or more processors are further to:
receive other published network event information from another publisher device;
combine the portion of the subscribed-to network event information, included in the published network event information, and another portion of the subscribed-to network event information included in the other published network event information; and
generate the subscribed-to network event information based on combining the portion of the subscribed-to network event information and the other portion of the subscribed-to network event information; and
where the one or more processors, when providing the subscribed-to network event information to the subscriber device, are further to:
provide the generated subscribed-to network event information to the subscriber device.

5. The device of claim 1,
where the subscription condition identifies an information set to be provided to the subscriber device;
where the one or more processors are further to:
determine that the information set is included in the published network event information; and
where the one or more processors, when providing the subscribed-to network event information, are to:
provide the subscribed-to network event information further based on determining that the information set is included in the published network event information.

6. The device of claim 1, where the one or more processors are further to:
receive, from the subscriber device, other published network event information based on providing the subscribed-to network event information to the subscriber device;
identify other subscribed-to network event information, subscribed to by another subscriber device, included in the other published network event information; and
provide the other subscribed-to network event information to the other subscriber device.

7. The device of claim 1,
where the subscription key identifies a set of information, and
where the set of information includes at least one of:
information that identifies a login attempt,
a user identifier associated with the login attempt,
information that identifies a time of the login attempt, or
information that identifies whether the login attempt was successful.

8. A computer-readable medium storing instructions, the instructions comprising:
one or more instructions that, when executed by one or more processors, cause the one or more processors to:
receive information that identifies a first subscriber device;
receive information that identifies first subscribed-to network event information to be provided to the first subscriber device;
receive information that identifies a second subscriber device that is different from the first subscriber device;
receive information that identifies second subscribed-to network event information to be provided to the second subscriber device,
the second subscribed-to network event information being different from the first subscribed-to network event information;
receive published network event information from one or more publisher devices;
determine that the published network event information includes information that matches a subscription key;
identify a value associated with the subscription key;
identify the first subscribed-to network event information based on identifying the value associated with the subscription key;
provide the first subscribed-to network event information to the first subscriber device based on determining that the published network event information includes information that matches the subscription key, the first subscribed-to network event information causing the first subscriber device to use the first subscribed-to network event information to provide a network service associated with the first subscribed-to network event information.

9. The computer-readable medium of claim 8, where the one or more instructions further cause the one or more processors to:
 determine that a plurality of subscriber devices, including the first subscriber device, have requested the first subscribed-to network event information; and
 where the one or more instructions, that cause the one or more processors to provide the first subscribed-to network event information to the first subscriber device, cause the one or more processors to:
  provide the first subscribed-to network event information to the plurality of subscriber devices.

10. The computer-readable medium of claim 8, where the one or more instructions, when executed by the one or more processors, further cause the one or more processors to:
 determine that the published network event information includes the second subscribed-to network event information;
 determine that the second subscriber device is subscribed to receive the second subscribed-to network event information; and
 provide the second subscribed-to network event information to the second subscriber device based on determining that the second subscriber device is subscribed to receive the second subscribed-to network event information.

11. The computer-readable medium of claim 8,
where the one or more instructions, that cause the one or more processors to receive the published network event information, cause the one or more processors to:
 receive first published network event information from a first publisher device; and
 receive second published network event information from a second publisher device; and
where the one or more instructions further cause the one or more processors to:
 combine the first published network event information and the second published network event information to form the published network event information.

12. The computer-readable medium of claim 8,
where the published network event information is first published network event information; and
where the one or more instructions further cause the one or more processors to:
 receive, from the first subscriber device, second published network event information based on providing the first subscribed-to network event information to the first subscriber device;
 determine that the second published network event information includes the second subscribed-to network event information; and
 provide the second subscribed-to network event information to the second subscriber device based on determining that the second published network event information includes the second subscribed-to network event information.

13. The computer-readable medium of claim 8, where the one or more instructions further cause the one or more processors to:
 store the published network event information using a hash table.

14. The computer-readable medium of claim 8,
where the subscription key identifies a set of information, and
where the set of information includes at least one of:
 information that identifies a login attempt,
 a user identifier associated with the login attempt,
 information that identifies a time of the login attempt, or
 information that identifies whether the login attempt was successful.

15. A method, comprising:
receiving, by a publication exchange device, information that identifies a subscriber device;
receiving, by the publication exchange device, a set of subscription keys associated with subscribed-to network event information to be provided to the subscriber device;
receiving, by the publication exchange device, published network event information from one or more publisher devices;
determining, by the publication exchange device, that the published network event information includes information that matches a subscription key of the set of subscription keys;
identifying, by the publication exchange device, a value associated with the subscription key;
identifying, by the publication exchange device, the subscribed-to network event information, from the published network event information, using the value; and
providing, by the publication exchange device, the subscribed-to network event information to the subscriber device based on determining that the published network event information includes information that matches the subscription key.

16. The method of claim 15, where the subscribed-to network event information causes the subscriber device to provide a network functions virtualization service associated with the subscribed-to network event information.

17. The method of claim 15, further comprising:
storing the published network event information in a data structure based on receiving the published network event information,
 where determining that the published network event information includes information that matches the subscription key comprises:
  searching the data structure, using the set of subscription keys, to identify the published network event information.

18. The method of claim 15, further comprising:
determining that a plurality of subscriber devices, including the subscriber device, are subscribed to receive the subscribed-to network event information,
 where providing the subscribed-to network event information to the subscriber device further comprises:
  providing the subscribed-to network event information to the plurality of subscriber devices.

19. The method of claim 15, further comprising:
receiving, from the subscriber device, other published network event information based on providing the subscribed-to network event information to the subscriber device;
identifying other subscribed-to network event information, subscribed to by another subscriber device, included in the other published network event information; and
providing the other subscribed-to network event information to the other subscriber device.

20. The method of claim 15, further comprising:
  providing, when other published network event information indicates that a login attempt has occurred, login information, associated with the login attempt, to another subscriber device.

\* \* \* \* \*